May 3, 1932.  H. R. SAXON  1,857,065
BUMPER CONSTRUCTION
Filed Dec. 26, 1930
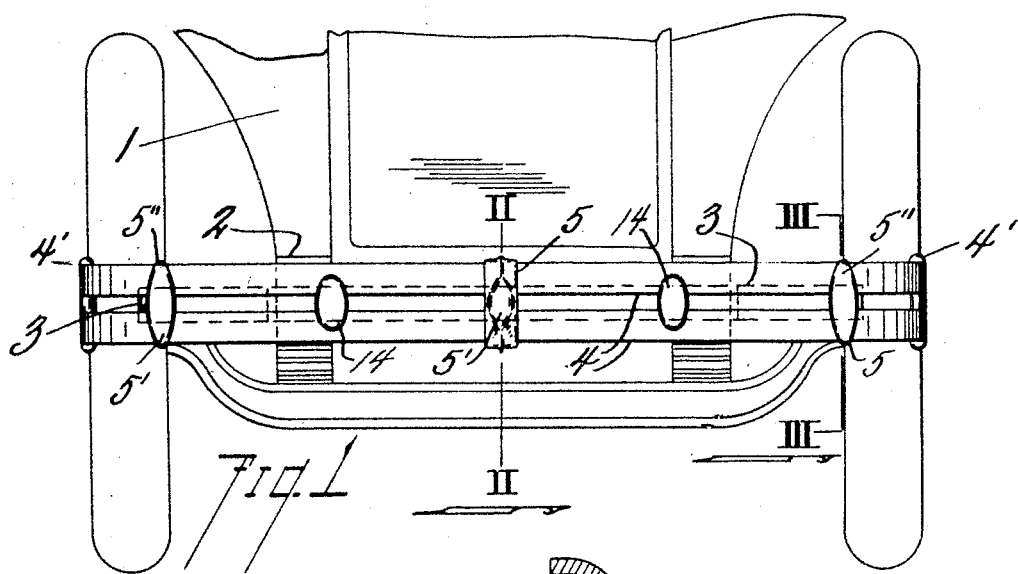
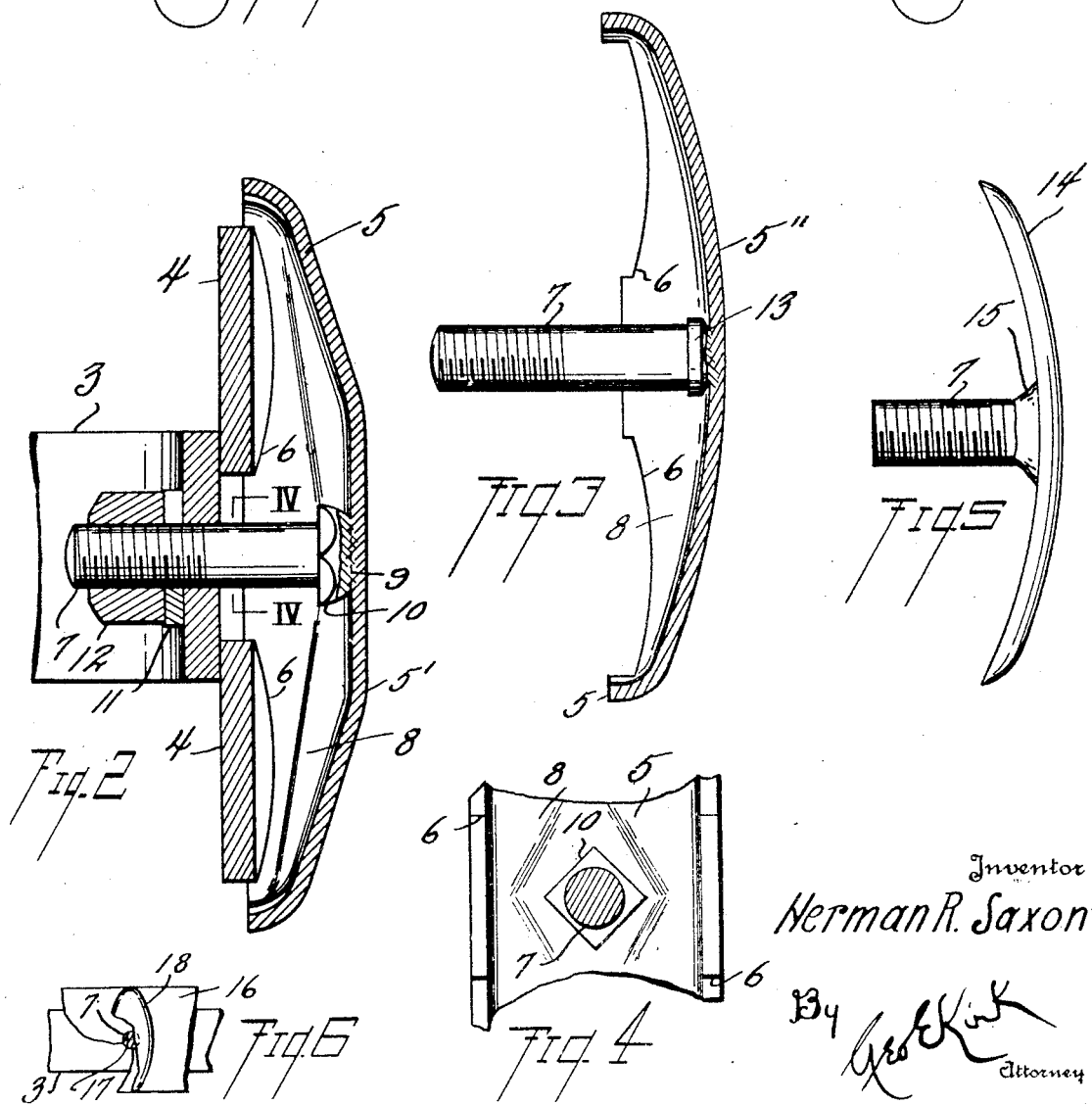
Inventor
Herman R. Saxon
By
Attorney Patented May 3, 1932

1,857,065

UNITED STATES PATENT OFFICE

HERMAN R. SAXON, OF TOLEDO, OHIO

BUMPER CONSTRUCTION

Application filed December 26, 1930. Serial No. 504,731.

This invention relates to motor vehicle bumpers.

This invention has utility when incorporated in assembly maintaining elements for motor vehicle bumpers.

Referring to the drawings:

Fig. 1 is a front view of a motor vehicle having a bumper of the invention herein mounted thereon;

Fig. 2 is a view on the line II—II, Fig. 1;

Fig. 3 is a view on the line III—III, Fig. 1;

Fig. 4 is a view on the line IV—IV, Fig. 2;

Fig. 5 is a side view of one of the auxiliary clamp members for the bumper of Fig. 1; and Fig. 6 is a fragmentary front view of a single bar bumper having the invention herein incorporated therewith.

Motor vehicle 1 has chassis 2 to which may be attached mounting bar 3 of a bumper. The bumper herein is shown as comprising a pair of parallel bars 4 held in assembled relationship at their termini by bolts 4'.

There is herein shown clamp assembly means for attaching the pair of bars 4 to the mounting bar 3. The intermediate assembly maintaining element comprises a medallion of a desired design formed from a sheet of wrought metal. This medallion 5 is provided with cut-out portions 6 forming seats for the bars 4, to thereby engage the bars to maintain a uniform spacing therebetween. The outer face 5' of the medallion 5 may be plated, the character of the material permitting a direct application of any desired finish.

Threaded stem 7 is attached directly to the inner or unfinished face 8 of the medallion 5 by weld 9. This stem 7 may be a bolt having a polygonal head 10 affording a larger weld surface than offered by the cross-sectional area of the stem.

The threaded stem extends inwardly from the medallion or head 5 between the bars 4, through the mounting bar 3 and spring washer 11 to mount nut 12 thereon completing the clamp for maintaining assembly between the pair of bars 4 and the bar 3.

A pair of supplemental clamps may be disposed one of each between the main or intermediate clamp and the bumper termini. These clamps may be of a different or similar design and of smaller and lighter dimensions. The medallion 5" may have the threaded stem welded directly thereto and the stem provided with a circular head 13.

The bumper may still be strengthened by the addition of an auxiliary clamp between the intermediate and each supplemental clamp. These auxiliary clamp elements may be of still smaller dimensions. The plate or medallion in this instance comprises wrought metal concavo-convex member 14 having threaded stem 7 directly welded thereto and metal added to the weld 15 to build up the union between the stem and medallion.

The medallions may overlap the entire width of the bars 4 or just a fraction thereof as desired. The different types of threaded stems may be attached to any type according to the use and position on the bumper as well as the general overall bumper dimensions.

There is thus provided a simplified bumper construction permitting a plated finish to be applied directly to one of the clamp members and having the threaded extension therefrom welded thereto avoiding the necessity of special attaching means or of the stem extending through the medallion to mar the outer appearance. The entire assembly maintaining element is of wrought metal permitting this direct plating and welding.

In instances wherein a single wide bumper bar 16 is used, such is supplied with holes 17 therethrough, through which stems 7 of decorative medallions 18 extend to anchor the bar 16 to the mounting means 3. There is thus provided a substantial assembly, the assembly means providing a decorative addition to the bumper.

What is claimed and is desired to secure by United States Letters Patent is:

1. An assembly maintaining element for the parts of a bumper comprising a sheet metal concavo-convex head engaging a part and a threaded stem weld anchored directly in the concave side of the head independently of disfiguring the head exterior, said head extending from the head interior to engage another part.

2. An assembly maintaining element for the parts of a bumper comprising a decorative sheet metal concavo-convex medallion engaging a plurality of the parts and a threaded stem welded in the concave side of the medallion and extending therefrom to engage another part.

3. A bumper assembly maintaining element comprising a sheet metal concavo-convex medallion providing a decorative convex face, and a threaded stem welded to the opposite concave side thereof.

4. An all wrought-metal bumper assembly mounting element comprising a concavo-convex medallion having a bumper engaging side and a decorative side, and independently of disfiguring the decorative side, a threaded stem welded directly to the bumper engaging side.

5. A motor vehicle bumper comprising a pair of parallel bars and a mounting bar, clamp assembly means therefor comprising a sheet metal concavo-convex medallion having its concave side abutting and concave side overlapping the pair of bars, a threaded stem welded directly to the medallion and extending between said pair of bars and through the mounting bar, and a nut on said stem holding all three bars in assembled relationship.

6. Motor vehicle bumper construction comprising a bumper bar having an opening therethrough, mounting means therefor, assembly means for the bumper comprising a concave side sheet metal medallion having a threaded stem welded directly to the concave side medallion, said medallion engaging the bumper bar to have the stem extend through said opening and mounting means, and a nut on said stem holding the bumper bar and mounting means in assembled relationship.

In witness whereof I affix my signature.

HERMAN R. SAXON.